Sept. 5, 1967 A. J. MAISEY 3,339,947
POWER OPERATED RELEASABLE PIPE COUPLING
Filed Jan. 25, 1965 3 Sheets-Sheet 1

INVENTOR
ALBERT J. MAISEY
By
ATTORNEYS

INVENTOR
ALBERT J. MAISEY

BY

ATTORNEY

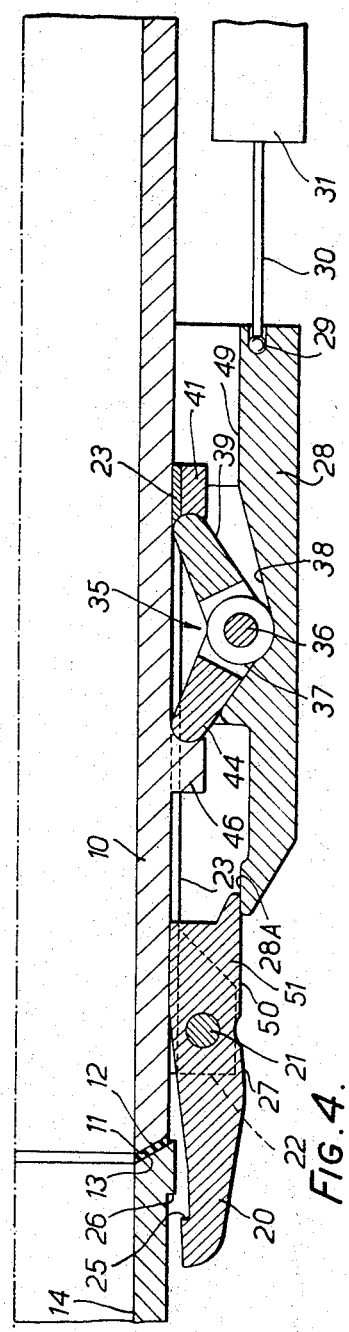
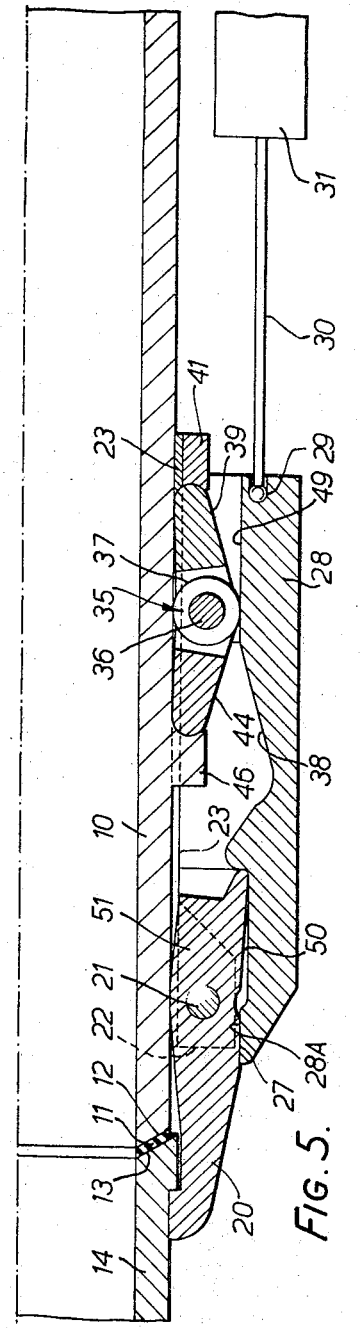

United States Patent Office 3,339,947
Patented Sept. 5, 1967

3,339,947
POWER OPERATED RELEASABLE PIPE COUPLING
Albert J. Maisey, Heston, England, assignor to Fairey Engineering Limited, Heston, England, a company of Great Britain
Filed Jan. 25, 1965, Ser. No. 427,672
Claims priority, application Great Britain, Jan. 24, 1964, 3,239/64
4 Claims. (Cl. 285—315)

ABSTRACT OF THE DISCLOSURE

This invention relates to a releasable pipe coupling comprising a latch sleeve slidable axially along a first pipe and carrying a number of pivotally mounted latch fingers which are adapted to engage an abutment on a second pipe to latch the two pipe ends together under pressure. A collapsible toggle strut linkage serves to force the sleeve along the pipe in a direction away from the pipe end to draw the second pipe into tight engagement with the first pipe after the latch fingers have engaged the abutment. A second sleeve is provided which has an internal cam surface and is slidable in an axial direction. Hydraulic jack driving means serves to force the second sleeve towards the end of the first pipe whereby the sleeve pivots the latch fingers into engagement with the abutment on the second pipe and then through the internal cam surface on the second sleeve the toggle linkage is straightened to slide the latch sleeve and fingers and draw the pipe ends together.

---

Figure 1:
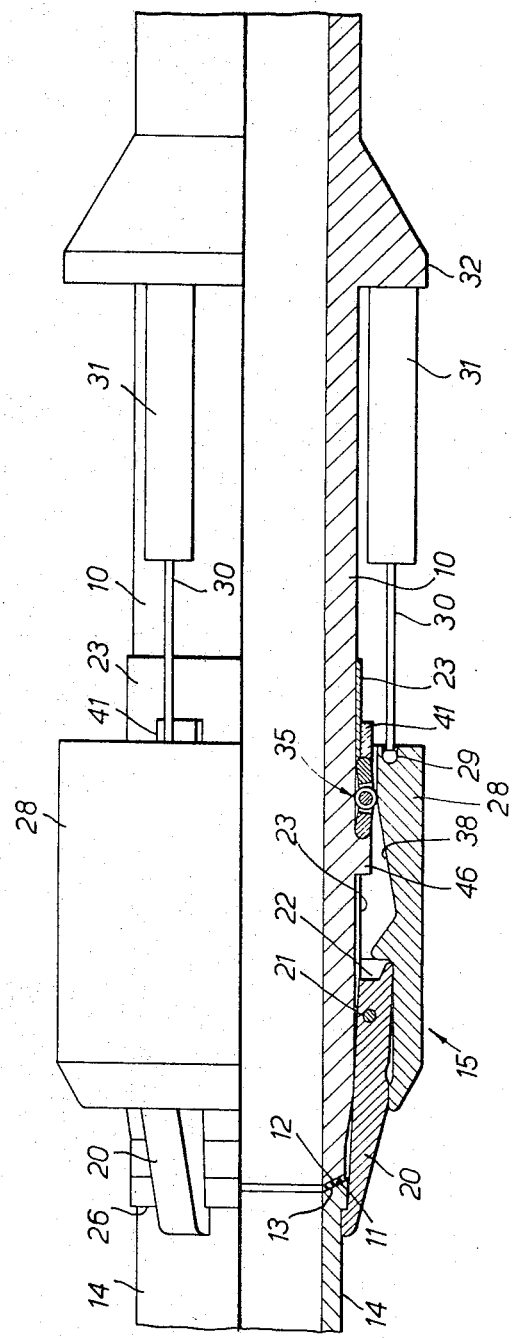

This invention relates to pipe couplings for releasably joining together a pair of pipes end-to-end with sealing pressure between the two pipe ends.

It is an object of the invention to provide a quick-release pipe coupling which can be mounted permanently on the end of one pipe and can be operated by remote control from one side of the joint only to couple that pipe to the end of a second pipe without imposing an axial load on the latter pipe to produce the required sealing pressure.

According to the present invention a pipe coupling means of the type specified comprises latch means slidably mounted on a first pipe end and adapted to releasably engage behind an abutment on a second pipe end to latch the two pipe ends together in aligned and abutted relationship, and thrust mechanism acting between the latch means and the first pipe end and operable to subject the two abutted pipe ends through the engaged latch means to equal and opposite axial thrusts which provide the required sealing pressure between them, for example to compress a sealing ring between their abutted sealing surfaces. In this way the reaction to the axial thrust required to compress the seal is made available through the latch itself from the first pipe, and this compressive thrust does not give rise to a corresponding axial load on the second pipe.

The thrust mechanism may be powered by pneumatic or hydraulic jack means, or by screw jack means driven by electric or other motors, under remote control.

In one form of the present invention the latch means comprises a latch sleeve or like supporting member to which are pivoted a number of latch fingers whose ends are adapted to latch with an abutment formed on the surface of the second pipe near its end, the latching sleeve being slidable axially along the first pipe on which it is mounted, collapsible toggle strut linkage means comprising the thrust mechanism and acting between the latch sleeve and an anchorage on the first pipe, and power-driven means for straightening the toggle linkage means to force the latch sleeve and the latch fingers axially along the first pipe in the direction away from the second pipe and thereby to draw the two pipe ends together to compress a seal between them.

The power-driven means for straightening the toggle linkage means may comprise a locking sleeve surrounding the latch sleeve and co-operating with the toggle linkages and actuated by electric screw, pneumatic or hydraulic jack means which force it to move axially along the first pipe, the locking sleeve being formed with a tapering cam surface which cooperates with each toggle linkage to straighten the linkage when the locking sleeve is forced along the pipe. Furthermore, when the locking sleeve is forced along the pipe its end part may be arranged to slide over the latch fingers and to engage cam surfaces formed on the backs of the latch fingers so as to cam the fingers radially into latching engagement with the abutment on the second pipe, and to hold the fingers locked in their latched positions, until the locking sleeve is withdrawn.

Figure 2:
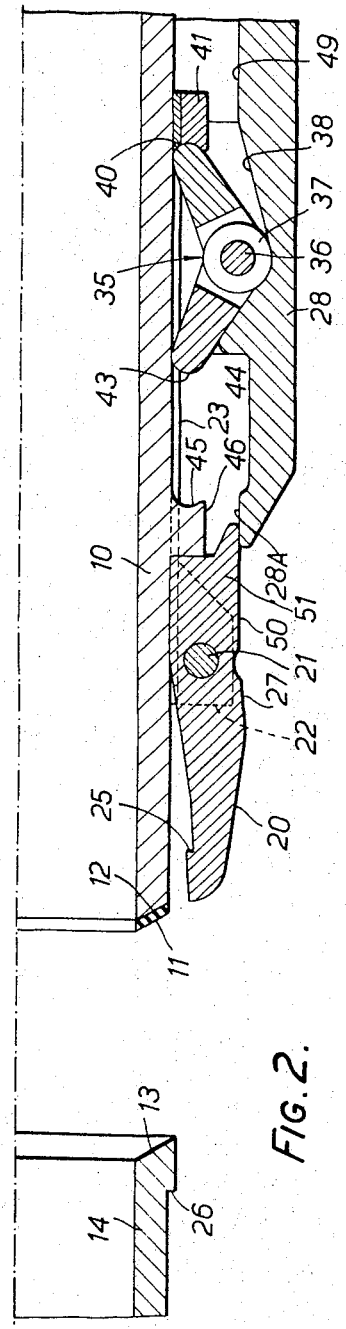
Figure 3:
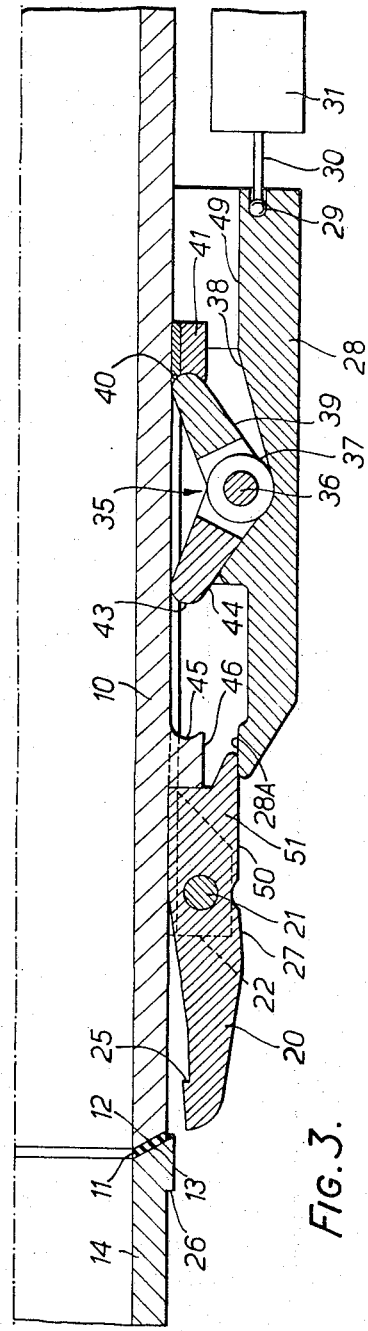

The invention may be carried into practice in various ways, but one specific embodiment will now be described by way of example only with reference to the accompanying drawings, in which FIGURE 1 is a side view, partly sectioned, of a quick-release pipe coupling in its latched position coupling two pipe ends together, FIGURE 2 is an axial half-section on a larger scale of the pipe coupling means in the fully-released position with the two pipe ends separated, FIGURE 3 is a view similar to FIGURE 2 but with the first pipe end advanced into abutting contact with the second pipe end, FIGURE 4 is a view similar to FIGURE 3 but with the latch fingers advanced around the co-operating abutment on the second pipe, and FIGURE 5 is a view similar to FIGURE 4 but showing the coupling in its fully latched position with the latch fingers locked in engagement behind the co-operating abutment and the sealing ring compressed between the pipe ends.

In the illustrated embodiment the pipe coupling is mounted on the nose piece of a charging tube extending from the fuelling machine of a nuclear reactor, the charging tube being required to be releasably coupled in a gas-tight manner to the mouth of any selected one of a plurality of standpipes extending into the core of the reactor, for the purpose of servicing the fuel or control channel associated with the standpipe.

The charging tube is formed in two main portions, whereon the upper portion (not shown) is bolted to a lower end cover plate of the main pressure vessel of the refuelling machine and incorporates a tubular double-universal-joint coupling which permits a limited degree of angular and rotational freedom of movement to the lower portion 10 of the charging tube which constitutes the nose piece. The latter is slidably mounted on the upper portion for vertical movement thereon and is supported and controlled by three double-acting hydraulic jacks distributed around the outside of the upper portion of the nose piece and acting between the lower cover plate of the main pressure vessel of the refuelling machine and an upper flange plate of the nose piece 10.

The nose piece 10 of the charging tube can thus be raised and lowered vertically with respect to the pressure vessel of the refuelling machine by actuation of the three hydraulic jacks in unison. Mechanical locks are incorporated in these jacks to retain the nose piece in its fully raised position when required.

The nose piece 10 carries a double annular metal strip seal (indicated diagrammatically at 11) at its frusto-conical lower edge 12 for sealing engagement with the co-operating frusto-conical rim 13 of the mouth of a selected vertical standpipe 14 protruding upwardly from the reactor core, and a latch mechanism generally indicated at 15 is mounted on and around the outside of the nose piece 10 for latching it to the standpipe 14. The latch mechanism 15 is hydraulically actuated to draw the standpipe 14 and the nose piece 10 towards one another for the purpose of loading the nose seal 11, but without applying a downward load to the standpipe 14.

The latch mechanism 15 comprises three latch fingers 20 pivoted at their upper ends at 21 to brackets 22 mounted on a tubular latch sleeve 23 which surrounds the cylindrical lower end of the nose piece 10 and can slide up and down it. The three latch fingers 20 and their associated brackets 22 are circumferentially distributed at equal spacing around the sleeve 23 and the latch fingers 20 protrude downwardly beyond the lower end 12 of the nose piece 10 and are formed near their tips with inwardly-facing latching abutment surfaces 25 for engagement behind a co-operating downwardly facing circumferential step 26 on the external surface of the standpipe 14 just below its upper end 13, to latch the nose piece 10 to the standpipe 14. Moreover each latch finger 20 is formed on its back with an inclined cam surface 27 for engagement by a sliding tubular locking sleeve 28 which surrounds the nose piece 10, the latch sleeve 23 and the three latch fingers 20, and can be moved vertically downwardly over the latch fingers 20 so that its lower edge engages their inclined cam surfaces 27 and forces the fingers 20 to pivot inwardly into latching engagement with the standpipe 14, the locking sleeve 28 when in its lowermost position as shown in FIGURES 1 and 5 locking the latch fingers 20 against release from latching engagement with the standpipe 14. The locking sleeve 28 is formed in its upper end with three circumferentially-spaced recesses 29 in which are trapped the ends of the plungers 30 of three double-acting hydraulic locking jacks 31 whose casings are engaged with a flange 32 at the upper end of the nose piece 10, so that on actuation the jacks 31 serve to thrust the locking sleeve 28 downwardly to its locked position, or to raise it to its upper position in which it releases the latch fingers 20 to allow them to pivot outwardly and release the standpipe 14.

Moreover the latch mechanism 15 includes three toggle strut linkages 35 distributed circumferentially around the nose piece 10, and trapped between it and the surrounding locking sleeve 28. The intermediate pivot pin 36 of each toggle linkage 35 carries a cam roller 37 journalled coaxially on the toggle pivot pin 36 and arranged to co-operate with an internal frusto-conical cam surface 38 formed in the bore of the locking sleeve 28, the cam surface 37 tapering in the upward direction. The upper end of the upper link 39 of each toggle linkage 35 constitutes a thrust finger having a rounded end 40 which engages in a correspondingly concave surface of one of three thrust blocks 41 rigidly mounted on the latch sleeve 23. The arrangement is such that when the locking sleeve 28 is raised to its upper or release position by the locking jacks 31, as shown in FIGURES 2 and 3, the rollers 37 of the three toggle linkages 35 lie at the lower ends of the tapered cam surface 38, and the three toggle strut linkages 35 are collapsed radially outwardly. However when the locking sleeve 28 is thrust downwardly by the locking jacks 31, the rounded ends 43 of their lower links 44 will engage in the concave recess 45 of an abutment ring 46 formed integrally on the nose piece 10, as shown in FIGURE 4, whereafter further downward sliding movement of the locking sleeve 28 will cause the rollers 37 of the three toggle linkages 35 to be cammed radially inwardly by the tapered cam surface 38 of the locking sleeve 28 and the toggle linkages 35 will be progressively straightened, causing the thrust fingers 39 at their upper ends to thrust upwardly against the thrust blocks 41 and so to raise the latch sleeve 23 and the three latch fingers 20 through a vertical distance of approximately three quarters of an inch, until the rollers ride off the upper end of the frusto-conical cam surface 38 and onto a cylindrical portion 49 of the bore of the locking sleeve 28, as shown in FIGURE 5. During the final downward movement the lower edge 28A of the locking sleeve 28 rides over the cam surfaces 27 on the backs of the latch fingers 20 to lock them in latching engagement with the standpipe 14.

Thus it will be understood that during the downward movement of the locking sleeve 28, at the same time as its lower end 28A is sliding over the cam surfaces 27 and pressing the latch fingers 20 radially inwardly towards the side of the standpipe 14, the frusto-conical cam surface 38 in the bore of the locking sleeve 28 is camming the toggle linkages 35 to their straightened positions thus progressively lifting the latch sleeve 28 and the three latch fingers 20 until, after the latch fingers 20 have come into latching engagement behind the abutment step 36 on the standpipe 14, the continued downward thrust of the locking sleeve 28 will cause the lower ends 43 of the toggle linkages 35 to apply a downward thrust to the nose piece 10 at the same time as the three latch fingers 20 apply a corresponding upward thrust to the standpipe 14, thus drawing the standpipe and the nose piece axially towards one another and loading the nose seal 11 but without applying a downward load to the standpipe 14 such as might damage the reactor core.

The nose piece 10 is unlatched from the standpipe by the converse process, effected by raising the locking sleeve 28 by means of the locking jacks 31 to collapse the toggles 35, thereby unloading the nose seal 11, and then to release the latch fingers 20 from latching engagement with the standpipe 14.

During the upward withdrawal of the locking sleeve 28 from its fully-lowered position of FIGURES 1 and 5, its lower edge will slide off the cam surfaces 27 of the three latch fingers 20 and onto upper cam surfaces 50 formed on the tails 51 of the latch fingers above their pivots 21. The upper cam surfaces 50 are slightly divergent in the radially-outward direction with respect to the lower cam surfaces 27, so that as the locking sleeve 28 slides upwardly over the upper cam surfaces 51 it will pivot the latch fingers 20 to move their lower ends radially outwardly clear of the standpipe 14, as shown in FIGURE 4, to allow the withdrawal of the nose piece upwardly from the standpipe 14. The locking sleeve when in its raised position will hold the latch fingers 20 in their outward position, as shown in FIGURES 3 and 2, to allow the nose piece to be lowered again onto the same or a different standpipe 14 for coupling thereto.

What I claim as my invention and desire to secure by Letters Patent is:

1. A releasable pipe coupling for coupling a pair of pipes together in end-to-end relationship with sealing pressure between them comprising a latch-supporting member embracing the first pipe and slidably mounted thereon for axial movement on and relative thereto, abutment means on the second pipe, a plurality of latch fingers pivoted to the latch-supporting member at points distributed around the first pipe and adapted to be moved pivotally into latching engagement with the abutment means on the second pipe to latch the two pipes in aligned and abutted relationship, an anchorage on the first pipe, and thrust mechanism comprising a collapsible toggle strut linkage connected between the latch-supporting member and the anchorage, and driving means acting on the toggle strut linkage and arranged when actuated to straighten the toggle strut linkage and thereby to move the latch-supporting member axially along and relatively to the first pipe in the direction away from the second pipe, whereby the actuation of the thrust mechanism when the latch fingers are in latching engagement with the abutment means on the second pipe applies equal and opposite thrust components to the two pipes respectively via the anchorage and the abutment means to provide sealing pressure between the abutted pipe ends.

2. A pipe coupling as claimed in claim 1 in which the driven means comprises a locking sleeve movably mounted on the first pipe and surrounding the latch-supporting member, and motor means coupled to the locking sleeve and arranged when energized to force the locking sleeve axially along the pipe, the locking sleeve being formed with internal means arranged to engage cooperating surfaces of the toggle strut linkage, and to straighten the toggle strut linkage when the locking sleeve is forced along the pipe by the motor means.

3. A pipe coupling as claimed in claim 2 in which the sides of said latch fingers away from said first pipe have inclined cam surfaces and said locking sleeve is arranged to engage and slide over the cam surfaces of the latch fingers when the locking sleeve is forced along the pipe by the motor means to straighten the toggle linkage whereby said fingers are cammed into latching engagement with said abutment means on the second pipe and are locked in their latched position.

4. A pipe coupling arrangement as claimed in claim 2 in which the motor means comprises a plurality of jacks and is controlled by remote control means.

References Cited
UNITED STATES PATENTS

| | | | |
|---|---|---|---|
| 1,991,343 | 2/1935 | Ball | 285—311 X |
| 2,645,506 | 7/1953 | Sturgis | 285—310 |
| 2,772,836 | 12/1956 | Gebhart | 285—311 X |
| 2,951,717 | 9/1960 | Zaber | 285—311 |
| 3,239,248 | 3/1966 | Jones. | |

FOREIGN PATENTS

| | | |
|---|---|---|
| 1,245,874 | 10/1960 | France. |
| 854,763 | 11/1960 | Great Britain. |

CARL W. TOMLIN, *Primary Examiner.*

R. G. BERKLEY, *Assistant Examiner.*